(12) United States Patent
Yu et al.

(10) Patent No.: US 8,779,904 B2
(45) Date of Patent: Jul. 15, 2014

(54) MULTIMODE REMOTE CONTROLLER COMPRISING AN ACCELEROMETER, A GYROSCOPE, A CAPACITIVE PRESSURE TRANSDUCER, AND A TOUCH PAD

(75) Inventors: Kuo-Chih Yu, New Taipei (TW);
Chih-Cheng Hu, New Taipei (TW);
Chien-Chun Fu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 184 days.

(21) Appl. No.: 13/296,245

(22) Filed: Nov. 15, 2011

(65) Prior Publication Data

US 2013/0099903 A1  Apr. 25, 2013

(30) Foreign Application Priority Data

Oct. 24, 2011  (TW) .............................. 100138507 A

(51) Int. Cl.
*G08B 21/00*  (2006.01)

(52) U.S. Cl.
USPC .................. 340/12.22; 340/12.23; 340/12.24; 340/4.11; 340/426.13; 341/176; 348/734

(58) Field of Classification Search
USPC ........ 340/12.22–12.26, 4.11, 426.13, 426.14; 341/176; 348/734
See application file for complete search history.

(56) References Cited

U.S. PATENT DOCUMENTS

| | | | |
|---|---|---|---|
| 2008/0088602 A1* | 4/2008 | Hotelling | 345/173 |
| 2009/0002218 A1* | 1/2009 | Rigazio et al. | 341/176 |
| 2010/0007518 A1* | 1/2010 | Kang et al. | 340/825.72 |
| 2011/0279223 A1* | 11/2011 | Hatambeiki et al. | 340/4.3 |
| 2013/0100021 A1* | 4/2013 | Larsen et al. | 345/161 |

\* cited by examiner

*Primary Examiner* — Nabil Syed
*Assistant Examiner* — Mark Rushing
(74) *Attorney, Agent, or Firm* — Novak Druce Connolly Bove + Quigg LLP

(57) ABSTRACT

A remote controller generates control signals according to the speed of movement sensed by a three-axis accelerometer and the direction of movement sensed by a gyroscope and transmits the control signals to a remotely controlled device communicating with the remote controller when the remote controller is in a first work mode, generates control signals according to touch sensing signals from a touch pad and transmits the control signals to the remotely controlled device when the remote controller is in a second work mode, and further generates control signals according to variations in the capacitance of the capacitive type pressure transducer unit and transmits the control signals to the remotely controlled device when the remote controller is in a third work mode.

7 Claims, 3 Drawing Sheets

MULTIMODE REMOTE CONTROLLER COMPRISING AN ACCELEROMETER, A GYROSCOPE, A CAPACITIVE PRESSURE TRANSDUCER, AND A TOUCH PAD

BACKGROUND

1. Technical Field

The present disclosure relates to remote controllers and, particularly, to a remote controller with a variety of input interfaces.

2. Description of Related Art

Although the conventional remote controllers can satisfy basic needs, it is desired to provide a remote controller with a variety of input interfaces to control remotely controlled devices.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
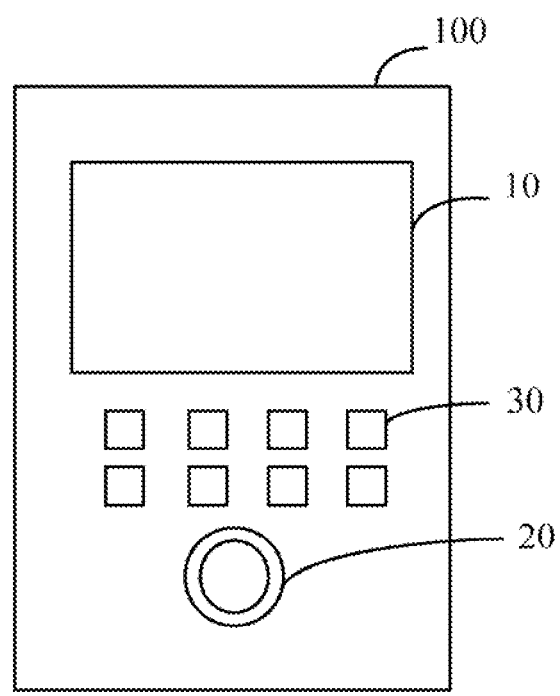
FIG. 1 is a schematic view of a front of a remote controller, in accordance with an exemplary embodiment.
Figure 2:
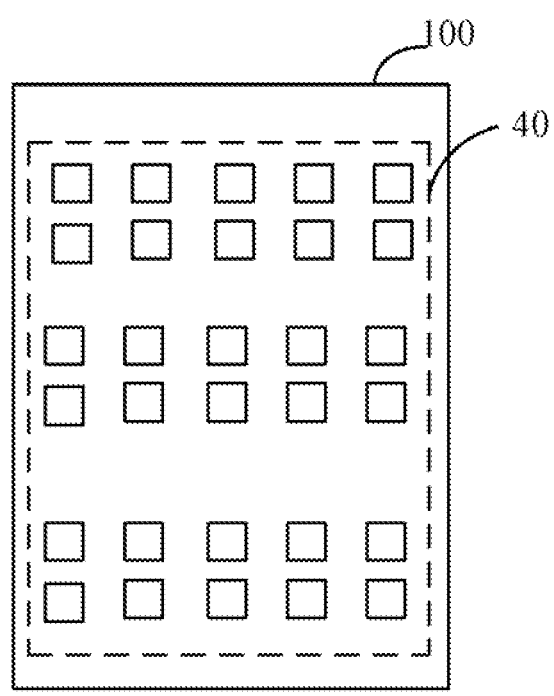
FIG. 2 is a schematic view of a back of the remote controller of FIG. 1, in accordance with an exemplary embodiment.

Referring to FIGS. 1-2, an embodiment of a remote controller 100 is illustrated. In this embodiment, the controller 100 includes a touch pad 10, a capacitive type pressure transducer unit 20, and a number of buttons 30, which are arranged on a front cover of the controller 100. The controller 100 further includes a keyboard 40 arranged on a back cover of the controller 100. The keyboard 40 may be a standard qwerty keyboard. In an alternative embodiment, the touch pad 10, the transducer unit 20, and the buttons 30 can be arranged on the back cover of the controller 100, and the keyboard 40 can be arranged on the front cover of the controller 100.

Figure 3:
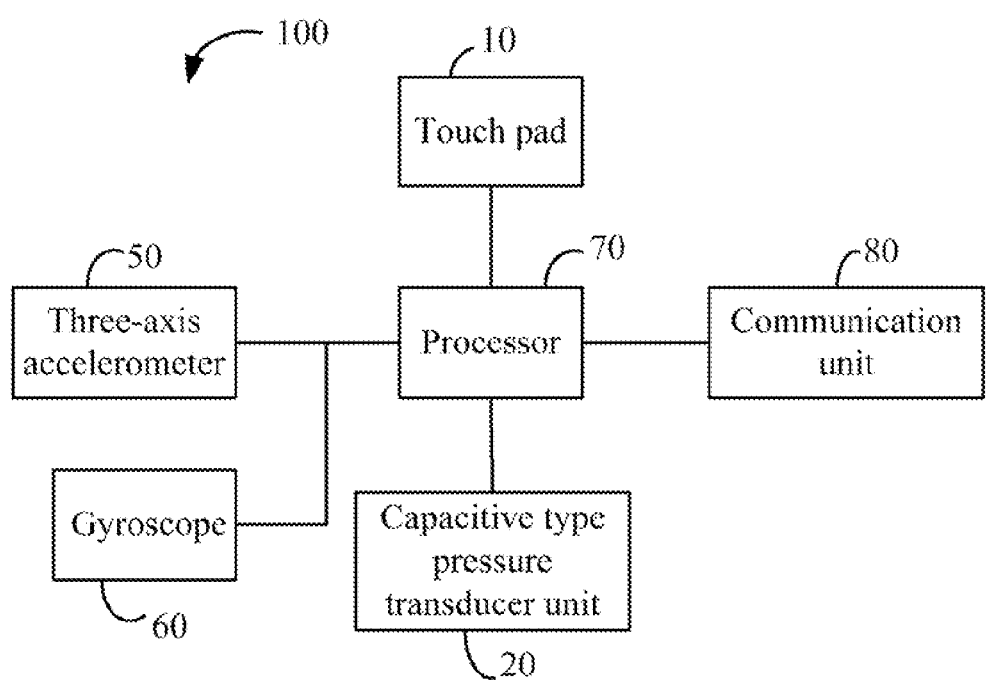
FIG. 3 is a block diagram of the remote controller of FIG. 1, in accordance with an exemplary embodiment.

Referring to FIG. 3, the controller 100 further includes a three-axis accelerometer 50, a gyroscope 60, a processor 70, and a communication unit 80. The communication unit 80 may include any one or more of a BLUETOOTH module, an infrared module, a USB interface, and a WIFI module, for example. The controller 100 transmits control signals to a remotely controlled device (hereinafter, RC device) (not shown) through the communication unit 80.

In this embodiment, the controller 100 includes a first work mode, a second work mode, and a third work mode. In the first work mode, the processor 70 generates control signals according to the speed of movement sensed by the acceleration 50 and the direction of movement sensed by the gyroscope 60, and transmits the control signals to the RC device through the communication unit 80 to direct the RC device to execute corresponding functions. In the second work mode, the processor 70 generates control signals according to touch sensing signals from the touch pad 10, and transmits the control signals to the RC device through the communication unit 80 to direct the RC device to execute corresponding functions. In the third work mode, the processor 70 generates control signals according to variations in the capacitance of the transducer unit 20, and transmits the control signals to the RC device through the communication unit 80 to direct the RC device to execute corresponding functions. In this embodiment, no matter which work mode the controller 100 is in, the processor 70 can generate control signals according to signals from the buttons 30 and keys (not labeled) of the keyboard 40 to control the RC device.

In this embodiment, the controller 70 switches operational modes between the first work mode and the second work mode according to touch sensing signals from the touch pad 10, and switches operational modes between the first work mode and the third work mode according to a variation in the capacitance of the transducer unit 20. In this embodiment, the first work mode 100 is set as the default work mode. In the first work mode, if the processor 70 receives touch sensing signals generated by executing a particular touch operation on the touch pad 10, the processor 70 switches the controller 100 from the first work mode to the second work mode, and in the second work mode, if the processor 70 receives touch sensing signals generated by executing the particular touch operation on the touch pad 10, or if the processor 70 does not receive any touch sensing signals from the touch pad 10 within a predetermined time interval, the processor 70 switches the controller 100 from the second work mode to the first work mode. The particular operation may be a fingertip or stylus tapping on the touch pad 10 a predetermined number of times within a predetermined time interval. In the first work mode, if the processor 70 determines that the variation in the capacitance of the transducer unit 20 falls within a predetermined range, the processor 70 switches the controller 100 from the first work mode to the third work mode, and in the third work mode, if the processor 70 determines that the variation in the capacitance of the transducer unit 20 falls within the predetermined range, or if the processor 70 determines that the capacitance of the transducer unit 20 does not change within a predetermined time interval, the processor 70 switches the controller 100 from the third work mode to the first work mode.

In an embodiment, the transducer unit 20 includes at least two capacitive type pressure transducers. The processor 70 generates control signals for controlling the RC device to execute corresponding functions according to variations in the capacitance of each transducer. In the embodiment, the transducer unit 20 includes four transducers which are symmetrically distributed at the corners of a square. In an alternative embodiment, the transducer 20 includes a single capacitive type pressure transducer. The transducer is substantially circular. The processor 70 generates control signals for controlling the RC device to execute corresponding functions according to variations in the capacitance of different portions of the single transducer.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A remote controller comprising:
a touch pad;
a capacitive type pressure transducer unit;
a three-axis accelerometer sensor;
a gyroscope;
a communication unit to communicate with a remotely controlled device; and
a processor to generate control signals according to the speed of the movement of the remote controller sensed by the three-axis accelerometer and the direction of the movement of the remote controller sensed by the gyroscope and transmit the control signals to the remotely controlled device when the remote controller is in a first work mode, generate the control signals according to touch sensing signals from the touch pad and transmit the control signals to the remotely controlled device when the remote controller is in a second work mode, and generate the control signals according to variations in the capacitance of the capacitive type pressure transducer unit and transmit the control signals to the remotely controlled device when the remote controller is in a third work mode, the processor further to switch operational modes between the first work mode and the second work mode according to the touch sensing signals from the touch pad, and switch operational modes between the first work mode and the third work mode according to a variation in the capacitance of the capacitive type pressure transducer unit, wherein when the remote controller is in the first work mode, if the processor determines that the variation in the capacitance of the capacitive type pressure transducer unit falls within a predetermined range, the processor is to switch the remote controller from the first work mode to the third work mode; when the remote controller is in the third work mode, if the processor determines that the variation in the capacitance of the capacitance type pressure transducer unit falls within the predetermined range, the processor is to switch the remote controller from the third work mode to the first work mode; and when the remote controller is in the third work mode, if the processor determines that the capacitance of the transducer unit does not change within a predetermined period, the processor is to switch the remote controller from the third work mode to the first work mode.

2. The remote controller as described in claim 1, wherein when the remote controller is in the second work mode, if the processor receives the touch sensing signals generated by executing the particular touch operation on the touch pad, the processor is to switch the remote controller from the second work mode to the first work mode.

3. The remote controller as described in claim 2, wherein when the remote controller is in the second work mode, if the processor does not receive any of the touch sensing signals from the touch pad within a predetermined time interval, the processor is to switch the remote controller from the second work mode to the first work mode.

4. The remote controller as described in claim 2, wherein the particular touch operation is tapping on the touch pad a predetermined number of times within a preset time interval.

5. The remote controller as described in claim 1, wherein the capacitance type pressure transducer unit comprises at least two capacitive type pressure transducers, and the processor is to generate the control signals for controlling the remotely controlled device according to variations in the capacitance of each of the at least two capacitive type pressure transducers.

6. The remote controller as described in claim 5, wherein the capacitance type pressure transducer unit comprises four capacitive type pressure transducers which are symmetrically distributed at the corners of a square.

7. The remote controller as described in claim 1, wherein the capacitance type pressure transducer unit comprises a single circular capacitive type pressure transducer, the processor is to generate the control signals for controlling the remotely controlled device according to variations in the capacitance of different portions of the single capacitive type pressure transducer.

* * * * *